(12) United States Patent
Han et al.

(10) Patent No.: US 9,029,000 B2
(45) Date of Patent: May 12, 2015

(54) CIRCUIT SUBSTRATE MODULE AND BATTERY MODULE USING THE SAME

(75) Inventors: Jung-Yup Han, Yongin-si (KR); No-Hyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 960 days.

(21) Appl. No.: 12/904,969

(22) Filed: Oct. 14, 2010

(65) Prior Publication Data

US 2011/0135970 A1   Jun. 9, 2011

(30) Foreign Application Priority Data

Dec. 3, 2009 (KR) .......................... 10-2009-0119097

(51) Int. Cl.
| | |
|---|---|
| H01M 2/24 | (2006.01) |
| H01M 10/48 | (2006.01) |
| H01M 2/20 | (2006.01) |
| H01M 10/42 | (2006.01) |
| H01M 10/44 | (2006.01) |

(52) U.S. Cl.
CPC ............ *H01M 2/204* (2013.01); *H01M 10/425* (2013.01); *H01M 2/206* (2013.01); *H01M 10/443* (2013.01); *H01M 10/486* (2013.01)

(58) Field of Classification Search
CPC .................................................. H01M 10/425
USPC ............................... 429/61, 99, 121, 123, 160
See application file for complete search history.

(56) References Cited

U.S. PATENT DOCUMENTS 7,927,728 B2   4/2011   Ha et al.

2009/0305116 A1   12/2009   Yang et al.
2010/0151299 A1   6/2010   Ha et al.

FOREIGN PATENT DOCUMENTS

| JP | 2001-256936 | 9/2001 |
|---|---|---|
| JP | 2001-345082 | 12/2001 |
| JP | 2001345082 A  * | 12/2001 |
| JP | 2002-100411 | 4/2002 |
| JP | 2009-059663 | 3/2009 |
| KR | 10-2007-0112489 | 11/2007 |
| KR | 10-2008-0025429 | 3/2008 |
| KR | 10-2008-0025430 A | 3/2008 |
| WO | WO 2007/102670 | 9/2007 |

OTHER PUBLICATIONS

Machine translation of JP 2001-345082 A (Oda).*
Registration Determination Certificate dated Nov. 30, 2011 for corresponding KR Application No. 10-2009-0119097.
Korea Office Action dated May 23, 2011 in application No. 10-2009-0119097.

* cited by examiner

*Primary Examiner* — Patrick Ryan
*Assistant Examiner* — Helen McDermott
(74) *Attorney, Agent, or Firm* — Knobbe Martens Olson & Bear LLP (57) ABSTRACT

A circuit substrate module and a battery module using the circuit substrate module are disclosed. The battery module includes: a plurality of battery units, wherein each battery unit comprises a plurality of battery cells, a case for accommodating the plurality of battery cells, a plurality of electrode terminals, and a plurality of communication connectors coupled to the battery cells and protruding out of the case; a circuit substrate module mounted on the plurality of battery units and comprising a circuit substrate, wherein a plurality of circuit substrate connectors are coupled to the plurality of communication connectors, wherein the plurality of circuit substrate connectors are coupled to a single external connector that is configured to be coupled to an external device.

15 Claims, 9 Drawing Sheets

CIRCUIT SUBSTRATE MODULE AND BATTERY MODULE USING THE SAME

RELATED APPLICATIONS

This application claims the benefit of Korean Patent Application No. 10-2009-0119097, filed on Dec. 3, 2009, in the Korean Intellectual Property Office, the disclosure of which is incorporated herein in its entirety by reference.

BACKGROUND

1. Field

One or more embodiments of the present invention relate to a circuit substrate module to which a plurality of communication connectors drawn from a plurality of battery units are connected, and a battery module using the circuit substrate module.

2. Description of the Related Technology

Secondary batteries refer to batteries that can be charged or discharged compared to batteries that cannot be charged, for example, primary batteries. Secondary batteries are widely used in small mobile devices, such as cellular phones, laptop computers, and camcorders, and in electronic devices, such as electronic drilling devices, electric cars, hybrid electric automobiles, electric bicycles, and uninterruptible power supply (UPS) devices. A representative example of the secondary batteries is a lithium secondary battery.

Compact mobile devices are typically used by connecting a small battery cell thereto. On the other hand, in order to manufacture a battery to be used in electric cars or large electronic devices, e.g., such as UPS devices, which require high capacity and high output, a plurality of battery units, in which each battery unit includes a plurality of battery cells, may be connected to one another via a connection member such as a bus bar to manufacture a battery module.

In each battery unit, a plurality of battery cells is typically arranged in a case serially or in parallel, and a positive electrode terminal and a negative electrode terminal that are connected to the plurality of battery cells protrude out of the case. Also, each battery unit typically includes a controller for controlling functions of the plurality of battery cells therein, such as a battery management system (BMS), and a communication connector for transmitting an electrical signal. A plurality of thermistor lines and a plurality of balancing lines are typically connected to the communication connector to detect a temperature of the battery cells or a charging state.

A general battery module is manufactured by assembling a battery unit by inserting a plurality of battery cells into a case, and a plurality of thermistor lines and a plurality of balancing lines electrically connected to the battery cells are connected to a communication connector. A connection line drawn from the communication connector is electrically connected to a controller such as a BMS.

However, in order to manufacture a conventional battery module, a plurality of thermistor lines and a plurality of balancing lines typically need to be connected to a controller such as a BMS for each battery unit, which is a complicated manufacturing process. Meanwhile, there is a need for the coupling structure of a connection member that electrically connects adjacent battery units, such as a bus bar, to be simpler.

SUMMARY

One or more embodiments of the present invention include a circuit substrate module in which a communication connector formed in a plurality of battery units and a battery management system (BMS) are easily connected, and a battery module using the circuit substrate module.

One or more embodiments of the present invention include a circuit substrate module in which a coupling structure of bus bars that electrically connect electrode terminals of adjacent battery units is simplified, and a battery module using the circuit substrate module.

Additional aspects will be set forth in part in the description which follows and, in part, will be apparent from the description, or may be learned by practice of the presented embodiments.

According to one or more embodiments of the present invention, a battery module includes: a plurality of battery units, wherein each battery unit comprises a plurality of battery cells, a case accommodating the plurality of battery cells, a plurality of electrode terminals, and a plurality of communication connectors coupled to the battery cells and protruding out of the case; and a circuit substrate module mounted on the plurality of battery units and comprising a circuit substrate, wherein a plurality of circuit substrate connectors are coupled to the plurality of communication connectors, wherein the plurality of circuit substrate connectors are coupled to a single external connector that is connected to an external device.

The plurality of communication connectors may be electrically connected to the plurality of corresponding circuit substrate connectors by connection lines.

Leads may be electrically connected to the plurality of circuit substrate connectors, and the plurality of leads may be patterned on the circuit substrate and connected to the single external connector.

At least one thermistor line and at least one balancing line connected to the plurality of battery cells may be connected to the plurality of communication connectors.

A bus bar may be formed to electrically connect a pair of adjacent battery units, and a first end of the bus bar may be connected to one electrode terminal of a first battery unit having a first polarity, and a second end of the bus bar may be connected to one electrode terminal of a second battery unit having a polarity opposite to the first polarity.

The bus bar may be coupled to the electrode terminals between the circuit substrate and the battery units by a coupling member.

A plurality of coupling holes may be formed in the circuit substrate, and the electrode terminals may be inserted into the plurality of coupling holes, and the bus bar may be coupled to the electrode terminals on the circuit substrate by a coupling member.

A plurality of coupling holes may be formed in the circuit substrate, and the bus bar may be inserted into the plurality of coupling holes, and the bus bar may be coupled to the electrode terminals within the circuit substrate by a coupling member.

The bus bar may be formed in the circuit substrate by insert injection molding and fixed to the electrode terminals by a coupling member.

The bus bar may be inserted into a groove formed in the circuit substrate facing the battery units and fixed to the electrode terminals by a coupling member.

According to one or more embodiments of the present invention, a circuit substrate module accommodating a plurality of battery cells comprises: a plurality of battery units coupled to the circuit substrate module, wherein each of the plurality of battery units comprises a plurality of electrode terminals and a plurality of communication connectors that are coupled to the plurality of battery cells; a plurality of circuit substrate connectors that is coupled to the plurality of communication connectors; a circuit substrate to which the plurality of circuit substrate connectors is mounted; and a single external connector that is coupled to the plurality of circuit substrate connectors and is configured to be connected to an external device.

The plurality of communication connectors may be electrically connected to corresponding circuit substrate connectors by respective connection lines.

A plurality of leads may be respectively electrically connected to the plurality of circuit substrate connectors, and the plurality of leads may be patterned in the circuit substrate and connected to the single external connector.

At least one thermistor line and at least one balancing line connected to the plurality of battery cells may be connected to the circuit substrate connector so as to be electrically connected to the circuit substrate connector.

A bus bar may be coupled between the circuit substrate and the battery units, wherein the bus bar is connected to electrode terminals that have different polarities of adjacent battery units.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the embodiments discussed below may have different forms and should not be construed as being limited to the descriptions set forth herein. Accordingly, the embodiments are merely described below, by referring to the figures, to explain certain aspects of the present description.

Figure 1:
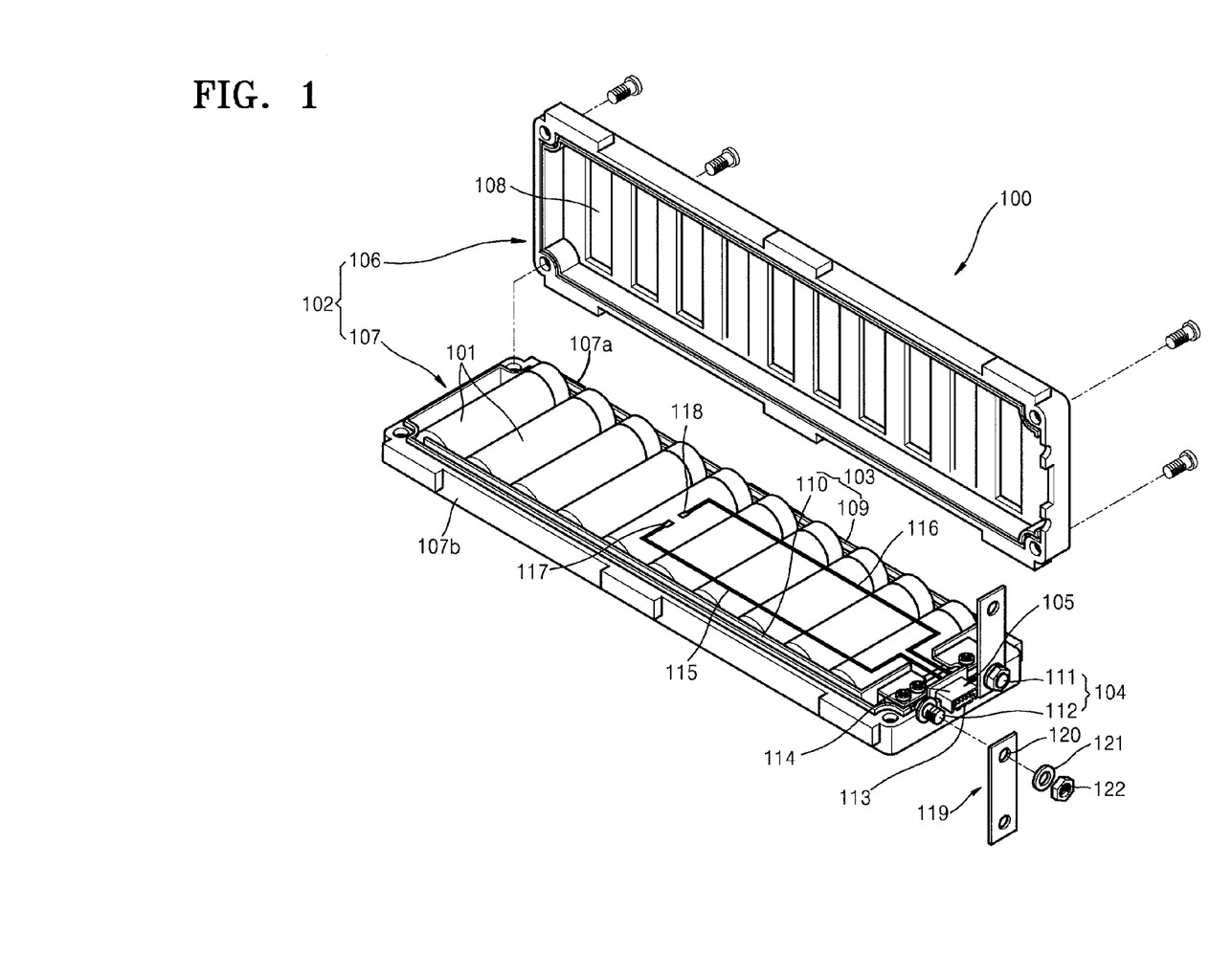
FIG. 1 is a separated perspective view illustrating a battery unit according to an embodiment of the present invention.

FIG. 1 illustrates a battery unit 100 according to an embodiment of the present invention.

Referring to FIG. 1, the battery unit 100 can include a case 102 in which a plurality of battery cells 101 are accommodated, electrode tabs 103 that electrically connect the plurality of battery cells 101 to one another, a plurality of electrode terminals 104 that are electrically connected to the electrode tabs 103 and are drawn out of the case 102, and a communication connector 105 that transmits an electrical signal that indicates temperatures or charging states of the battery cells 101.

Each battery cell 101 may be a cylindrical secondary battery. As well known in the art, a cylindrical secondary battery can include an electrode assembly that includes a positive electrode plate, a negative electrode plate, and a separator that is interposed between the positive and negative electrode plates and that is wound in a jelly-roll type manner, a cylindrical can in which the electrode assembly is accommodated, and a cap assembly that seals an opening portion of the cylindrical can.

According to the current embodiment of the present invention, the battery cells 101 may be arranged parallel to one another and electrically connected to each other to form a high output and high capacity battery unit 100. The battery cells 101 are not limited to being cylindrical secondary batteries and may instead be prismatic secondary batteries or polymer secondary batteries.

The case 102 may include an upper case 106, and a lower case 107 that is coupled to the upper case 106. When the upper case 106 and the lower case 107 are coupled to each other, an inner space that accommodates the plurality of battery cells 101 can be formed. A plurality of heat dissipation holes 108, for dissipating heat generated during driving of the battery unit 100 out of the battery unit 100, can be formed in the upper case 106, the lower case 107, or in both.

The plurality of battery cells 101 may be arranged parallel to one another in the case 102 continuously in a length direction, and may be connected to one another via the electrode tabs 103. The electrode tabs 103 may include a first electrode tab 109 connected to a first side of the battery cell 101 and a second electrode tab 110 connected to a second side of the battery cell 101.

The first electrode tab 109 and the second electrode tab 110 may be conductive plates formed of, for example, nickel, and be strip-shaped. The first electrode 109 and the second electrode tab 110 may be electrically connected to each of the battery cells 110 by welding. The first electrode tab 109 may be mounted at an inner side of a first sidewall 107a in a length direction of the lower case 107, and the second electrode tab 110 may be mounted at an inner side of a second sidewall 107b that is opposite to the first sidewall 107a.

The plurality of battery cells 101 may be connected to one another in parallel via the first electrode tab 109 and the second electrode tab 110. Alternatively, the plurality of battery cells 101 may be connected serially or in a serial-parallel combined manner.

A plurality of electrode terminals 104 may be formed at a front side of the case 102. The electrode terminals 104 may include a first electrode terminal 111 that is electrically connected to the first electrode tab 109 and a second electrode terminal 112 that is electrically connected to the second electrode tab 110. The first electrode terminal 111 and the second electrode terminal 112 may extend from an inner portion of the case 102 and drawn out of the case 102. The first electrode terminal 111 and the second electrode terminal 112 may be bolt type terminals but are not limited thereto.

The communication connector 105 may be disposed at the front side of the case 102 in which the first electrode terminal 111 and the second electrode terminal 112 are installed while a plurality of connection pins 113 are installed in a connector housing unit 114. The communication connector 105 may be electrically connected to a plurality of thermistor lines 115 and a plurality of balancing lines 116 so as to transmit an electrical signal that indicates data regarding states of the battery cells 101, such as temperature or charging states of the battery cell 101 to a controller such as a BMS.

A thermistor sensor 117 is a device that detects the temperature of one battery cell 101 and can be installed at an end portion of each thermistor line 115. A balancing sensor 118 can detect an amount of electric charge stored inside one battery unit 100 and can be installed at an end portion of each balancing line 116. As long as the thermistor sensors 117 and the balancing sensors 118 are electrically connected to the plurality of battery cells 101, the placement of the thermistor sensors 117 and the balancing sensors 118 are not limited to that as described above. The pluralities of thermistor lines 115 and balancing lines 116 may be electrically connected to the connection pins 113. The number of the connection pins 113 is not limited to that described in the present embodiment, and may be various.

Bus bars 119 that electrically connect the battery unit 100 to adjacent battery units 100 may be installed at each of the first electrode terminal 111 and the second electrode terminal 112 of the battery unit 100. Each bus bar 119 can be a conductive plate. Insertion holes 120 through which the first electrode terminal 111 of a first battery unit 100 and the second electrode terminal 112 of a battery unit 100 adjacent to the first battery unit 100 are inserted may be formed in each bus bar 119. While a washer 121 may be interposed around each of the first electrode terminal 111 and the second electrode terminal 112, the bus bars 119 may be coupled thereto by using nuts 122.

Figure 2:
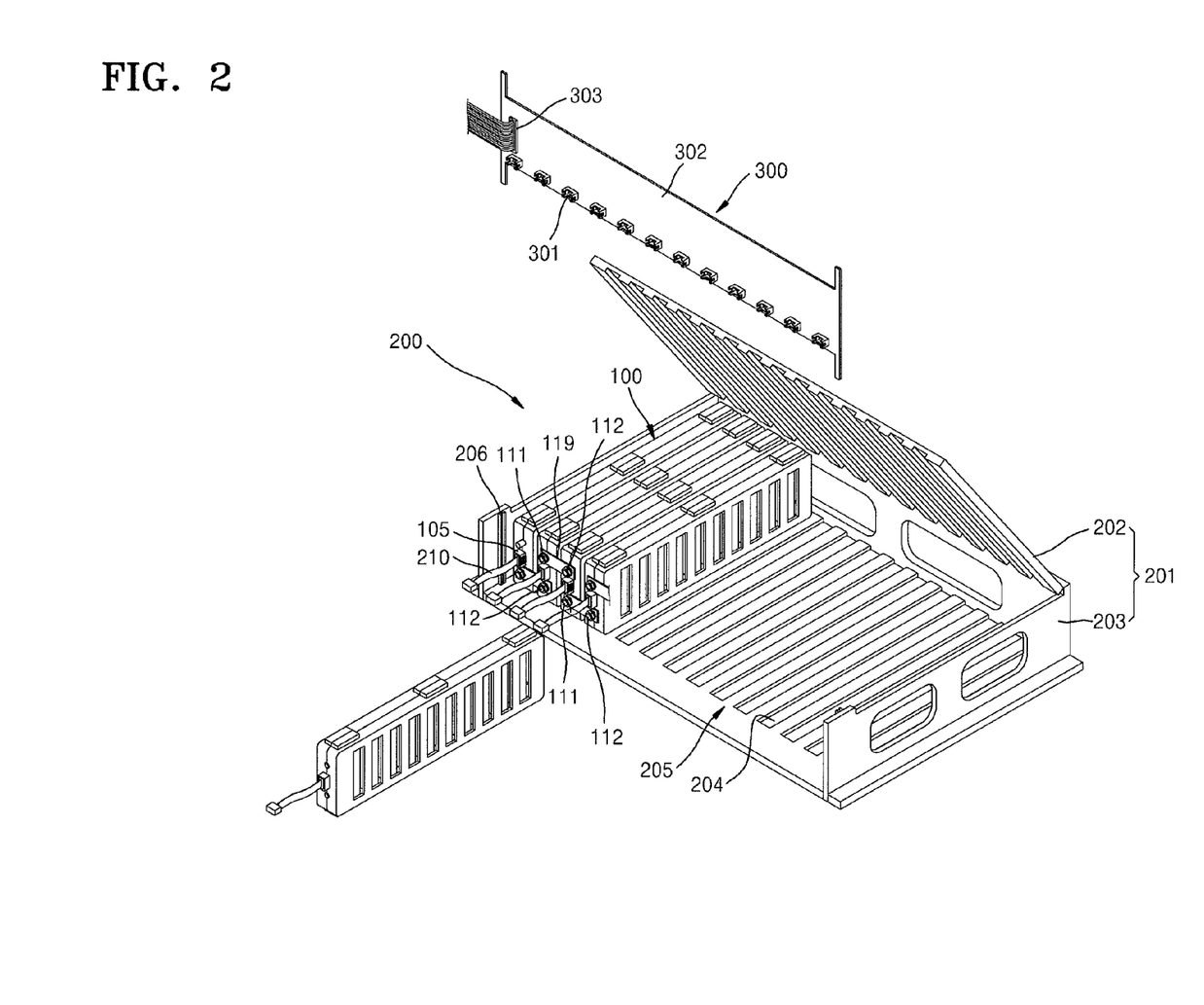
FIG. 2 is a separated perspective view illustrating a battery module in which the battery unit of FIG. 1 is stacked a plurality of times.

FIG. 2 illustrates a battery module 200 in which the battery unit 100 of FIG. 1 is stacked a plurality of times.

Referring to FIG. 2, a plurality of battery units 100 can be formed. The battery units 100 may be arranged such that polarities of adjacent battery units 100 alternate. The first electrode terminal 111 of a first battery unit 100 may be connected to the second electrode terminal 112 of a battery unit 100 that is adjacent to the above battery unit 100 for all first and second electrode terminals 111 and 112 via the bus bars 119. The plurality of battery units 100 may be continuously connected to one another, thereby forming the battery module 200. The number of battery units 100 may be determined in consideration of required charging and discharging capacities.

While being connected serially or in parallel via the bus bars 119, the plurality of battery units 100 may be arranged in a case 201. The case 201 includes an upper case 202 and a lower case 203 that is coupled to the upper case 202.

A plurality of guide grooves 204 through which the plurality of battery units 100 are mounted when the upper case 202 and the lower case 203 are coupled to each other may be formed in the upper case 202 and the lower case 203. Accordingly, each of the battery units 100 may be coupled to the case 201 by being guided by the guide grooves 204.

A circuit substrate module 300 may be installed at an opening portion 205 of the case 201, that is, at an inlet where the battery units 100 are inserted to be mounted. The circuit substrate module 300 may include a circuit substrate 302 that may be detachably coupled to the case 201 via a groove of a guide unit 206 formed along two sidewalls of the lower case 203 that are adjacent to the opening portion 205. Alternatively, the circuit substrate 302 may be coupled to the upper case 202 or the lower case 203 by installing a coupling member, such as a boss and screw-coupling, and then coupling the circuit substrate 302 thereto.

The communication connectors 105 of the battery units 100 may be electrically connected to a plurality of circuit substrate connectors 301 mounted on the circuit substrate module 300 by connection lines 210, and the plurality of circuit substrate connectors 301 may be electrically connected to a single external connector 303.

The configuration described above will be further described in detail below.

Figure 3:
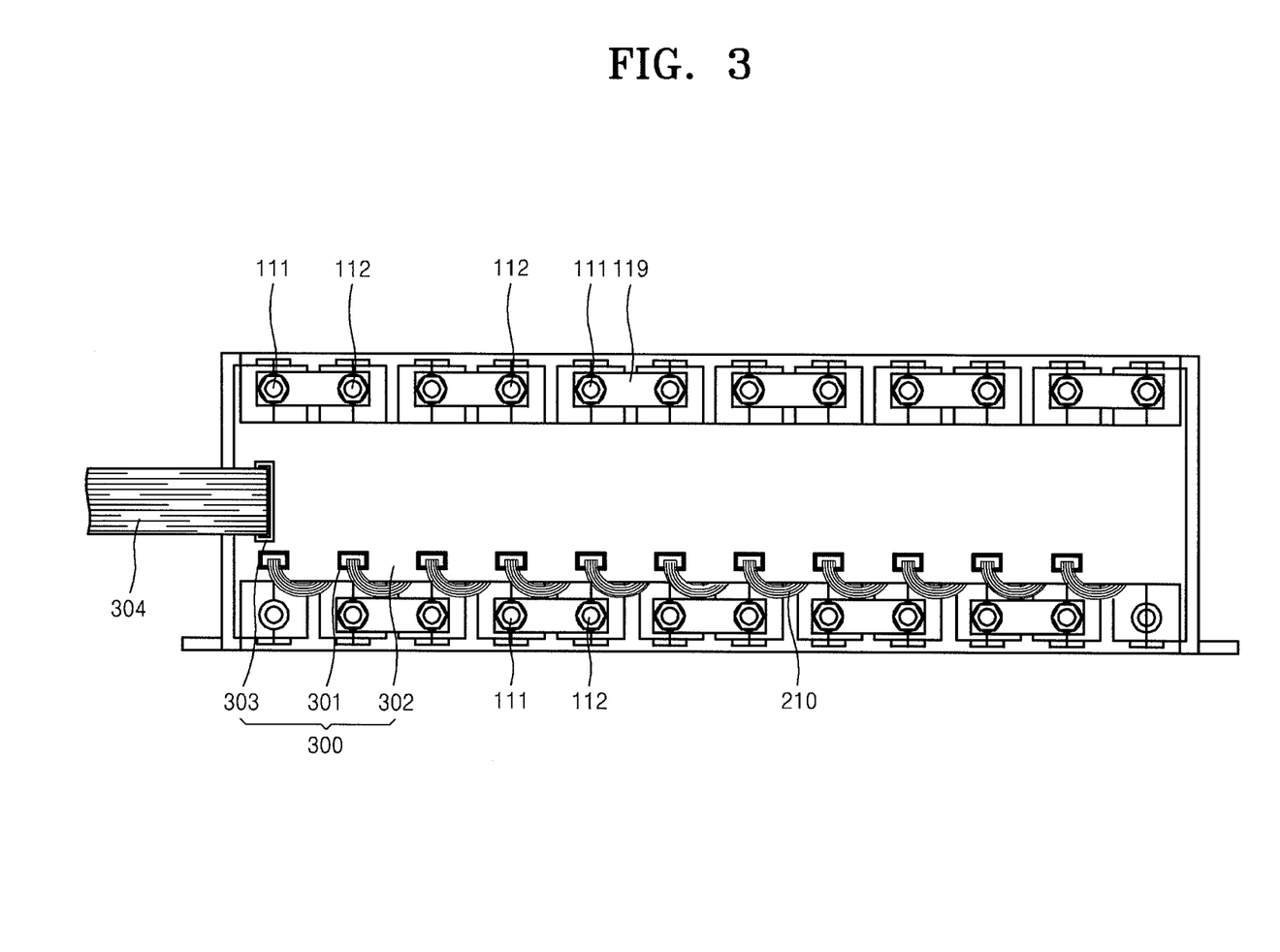
FIG. 3 is a front view illustrating a portion of the battery module where a circuit substrate module of FIG. 2 is mounted.
Figure 4:
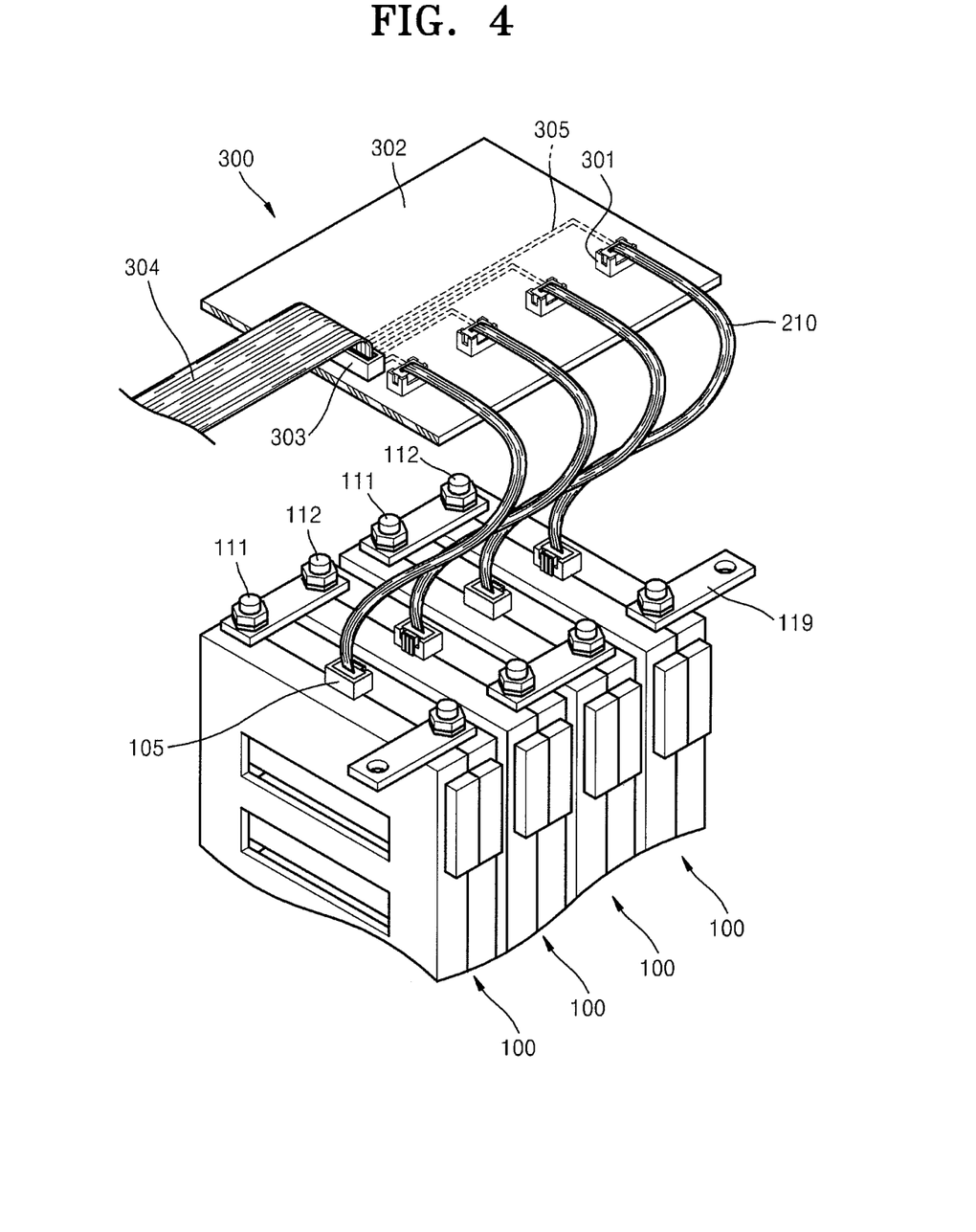
FIG. 4 is a separated perspective view illustrating the portion of FIG. 3.

FIG. 3 is a front view illustrating a portion of the battery module 200 where the circuit substrate module 300 of FIG. 2 is mounted, and FIG. 4 is a separated perspective view illustrating a portion of the battery module 200 where the circuit substrate module 300 of FIG. 3 is mounted.

Referring to FIGS. 3 and 4, the circuit substrate module 300 may include the circuit substrate connectors 301 electrically connected to the communication connectors 105 formed in the plurality of battery units 100 via the connection lines 210, the circuit substrate 302 to which the circuit substrate connectors 301 are mounted, and the external connector 303 that is electrically connected to the circuit substrate connectors 301 and that is to be connected a controller such as a BMS via a cable 304.

The number of circuit substrate connectors 301 may correspond to the number of communication connectors 105, and the circuit substrate connectors 301 may be connected to the communication connectors 105 via the connection lines 210, respectively. Accordingly, in each battery unit 100, the thermistor lines 115 and the balancing lines 116 electrically connected to the battery cells 101 (see FIG. 1) may be connected to one circuit substrate connector 301, and data signals indicating the temperatures or the charging states of the battery cells 101 in the battery unit 100 may be transmitted.

The circuit substrate connectors 301 may be separated a predetermined distance from one another along an edge of the circuit substrate 302. The plurality of circuit substrate connectors 301 may be electrically connected to a plurality of leads 305, respectively, and the plurality of leads 305 may be patterned in the circuit substrate 302. The plurality of leads 305 may be collected and respectively connected to the external connector 303.

Accordingly, in the plurality of battery units 100, the communication connectors 105 and the circuit substrate connectors 301 may be connected to each other via the connection lines 210, and the leads 305 connected to each of the circuit substrate connectors 301 may be collected and respectively connected to the external connector 303, and the cable 304 drawn from the external connector 303 may be electrically connected to a controller such as a BMS.

As described above, the pluralities of thermistor lines 115 and balancing lines 116 electrically connected to the battery cells 101 may be electrically connected to the plurality of communication connectors 105, the plurality of connection lines 210, the plurality of circuit substrate connectors 301, and the plurality of leads 305, and collected in the external connector 303, thereby easily controlling the states of the battery cells 101.

The bus bars 119 may electrically connect the first electrode terminal 111 of the battery units 100 and the second electrode 112 of adjacent battery units 100 and may be installed between the battery units 100 and the circuit substrate 302.

The circuit substrate module 300 may further include a unit that not only connects the communication terminals described above but also to which the bus bars 119 may be coupled for convenience of assembling.

Figure 5:
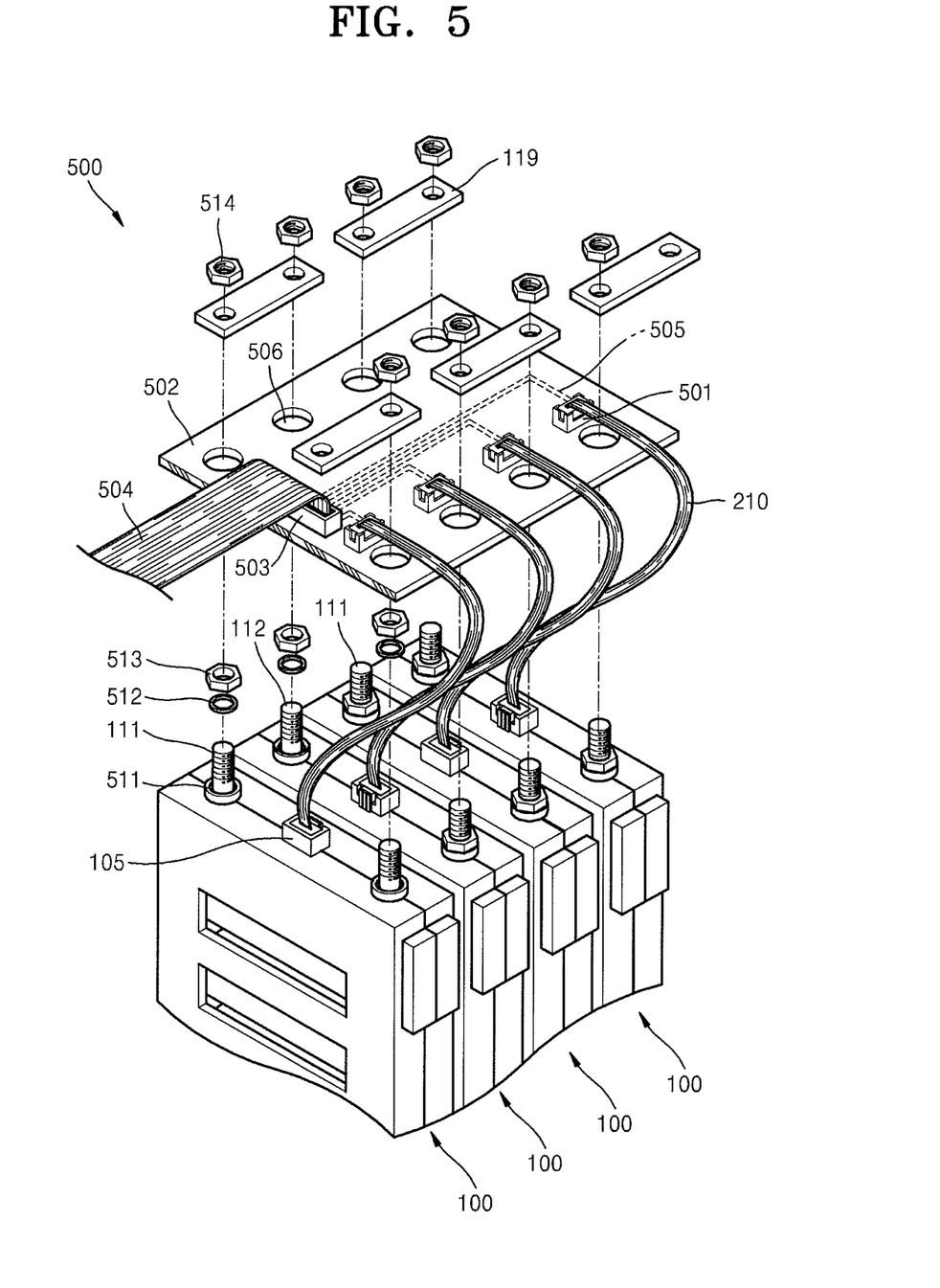
FIG. 5 is an exploded separated perspective view illustrating a portion of a battery module where a circuit substrate module is mounted, according to another embodiment of the present invention.
Figure 6:
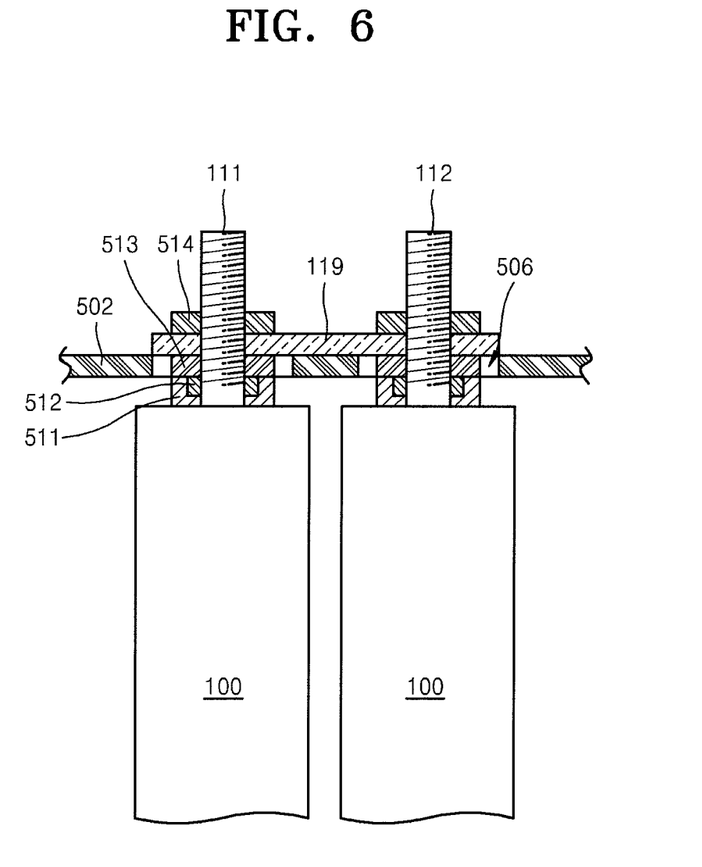
FIG. 6 is a cross-sectional view illustrating the portion of FIG. 5.

FIG. 5 may be an extended separated perspective view illustrating a portion of a battery module where a circuit substrate module 500 is mounted, according to another embodiment of the present invention. FIG. 6 is a cross-sectional view illustrating the portion of the circuit substrate module 500 of FIG. 5.

Hereinafter, like reference numerals denote like elements throughout the drawings.

Referring to FIG. 5, a circuit substrate 502 may be disposed on the plurality of battery units 100 disposed adjacent to one another. A plurality of circuit substrate connectors 501 may be mounted on the circuit substrate 502 in a length direction. A plurality of communication connectors 105 electrically connected to thermistor lines 115 (see FIG. 1) and balancing lines 116 within battery units 100 via a plurality of connection lines 210 may be connected to the plurality of circuit substrate connectors 501.

The circuit substrate connectors 501 may be electrically connected to a plurality of leads 505, and the leads 505 may be patterned in the circuit substrate 502. The patterned leads 505 are collected and respectively connected to a single external connector 503, and one cable 504 that is electrically connected to the external connector 503 may be electrically connected to a controller such as a BMS.

A plurality of coupling holes 506 may be formed in the circuit substrate 502. First electrode terminals 111 and second electrode terminals 112 may be inserted into the coupling holes 506, respectively. The first electrode terminals 111 and the second electrode terminals 112 may be bolt-type terminals, but are not limited thereto.

A gasket 511 may be installed between the battery unit 100 and the circuit substrate 502 along circumferences of each of the first electrode terminals 111 and the second electrode terminals 112 for insulation, and washers 512 and first nuts 513 may be interposed on upper surfaces of the gaskets 511. Bus bars 119 may be positioned on the first nuts 513 to electrically connect the first electrode terminals 111 and the second electrode terminals 112 of pairs of the battery units 100 that are adjacent to each other.

The bus bars 119 may be coupled to the first electrode terminals 111 and the second electrode terminals 112 of pairs of battery units 110 that are adjacent to each other. Second nuts 514 may be positioned on the bus bars 119 so that the first electrode terminals 111 and the second electrode terminals 112 are firmly fixed with respect to the bus bars 119.

The first electrode terminal 111 and the second electrode terminal 112 may be coupled to the bus bar 119 by not only using a bolt and nut coupling method but also by any of various other methods such as, for example, a welding coupling method or a laser coupling method. Also, the number or shape of the coupling members including the gaskets 511, the washers 512, the first nuts 513, and the second nuts 514 is not limited.

As described above, the first electrode terminal 111 and the second electrode terminal 112 may be inserted through the coupling holes 506 of the circuit substrate 502 between the battery unit 100 and the circuit substrate 502. Thus, ends of the first electrode terminal 111 and the second electrode terminal 112 may protrude through the circuit substrate 502, and the bus bar 119 may be coupled to the first electrode 111 and the second electrode 112 on the circuit substrate 502.

Also, sizes of the coupling holes 506 formed in the circuit substrate 502 may be greater than sizes of the first electrode terminal 111 and the second electrode terminal 112.

That is, when an internal pressure of the battery units 100 increases while being driven, the battery units 100 can thermally expand. When the battery units 100 are deformed, portions where the battery units 100 are connected via the bus bars 119 can also be deformed.

Even though portions where the first electrode terminal 111 and the second electrode terminal 112 are coupled with respect to the bus bar 119 are deformed, the circuit substrate 502 in which the coupling holes 112 are formed can be formed so as to maintain a movement space in which the deformation described above may be accommodated. Thus, deformation of the portion where the first electrode terminal 111 and the second electrode terminal 112 are coupled with respect to the bus bar 119 may be prevented in advance.

As described above, the plurality of circuit substrate connectors 501 and the plurality of leads 505 connected to the circuit substrate connectors 501 and patterned so as to transmit electrical signals to the single external connector 503 are formed in the circuit substrate module 500, and thus the battery cells 101 in the plurality of battery units 100 may be easily controlled.

Furthermore, the first electrode terminal 111 and the second electrode terminal 112 may be positioned through the coupling holes 506 formed in the circuit substrate 502, and the first electrode terminal 111 and the second electrode terminal 112 may be coupled and fixed on the circuit substrate 502, and thus the battery unit 100 and the circuit substrate module 500 may form a module.

Figure 7:
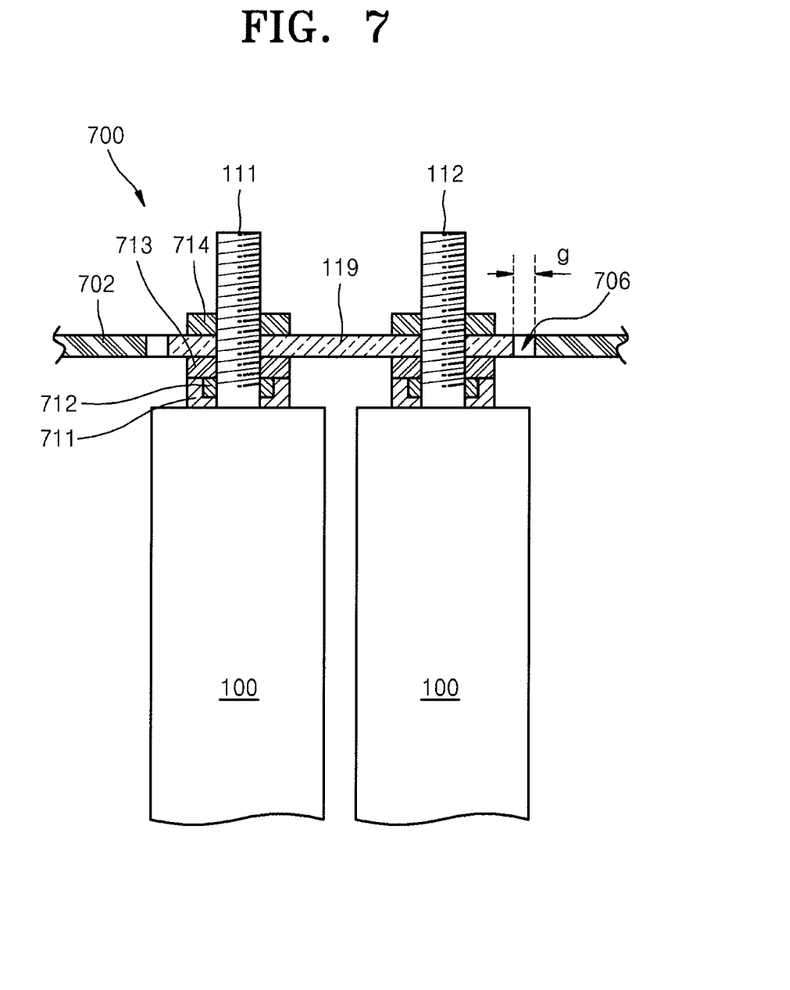
FIG. 7 is a cross-sectional view illustrating a portion of a battery module where a circuit substrate module is mounted, according to another embodiment of the present invention.

FIG. 7 is a cross-sectional view illustrating a portion where a circuit substrate module 700 is mounted, according to another embodiment of the present invention.

Referring to FIG. 7, a circuit substrate 702 is disposed on a plurality of battery units 100 that are adjacent to each other. A plurality of coupling holes 706 may be formed in the circuit substrate 702. A first electrode terminal 111 and a second electrode terminal 112 may be inserted into the coupling hole 706, and end portions of the first electrode terminal 111 and the second electrode terminal 112 may protrude through the circuit substrate 702. The first electrode terminal 111 and the second electrode terminal 112 in the illustrated embodiment are bolt-type terminals but are not limited thereto.

A washer 712 and a first nut 713 may be stacked on an upper surface of a gasket 711 along a circumference of the first electrode terminal 111 for insulation and the same structure may also be stacked along a circumference of the second electrode terminal 112 for insulation between the battery units 100 and the circuit substrate 702. A bus bar 119 may be disposed on each first nut 713 to electrically connect the first electrode terminal 111 and the second electrode terminal 112 of a pair of battery units 100 that are adjacent to each other.

Sizes of the coupling holes 706 formed in the circuit substrate 702 may be greater than sizes of the bus bar 119. That is, a number of coupling holes 706 corresponding to the number of bus bars 119 may be formed in the circuit substrate 702, and the coupling holes 706 may be formed with a size in which the bus bar 119 may be accommodated. When the bus bar 119 is inserted into the coupling hole 706, there can be a gap g between an inner wall of the circuit substrate 702 in which the coupling hole 706 is formed and a boundary of the bus bar 119.

The bus bar 119 may be coupled to the first electrode terminal 111 and the second electrode terminal 112 of a pair of battery units 110 that are adjacent to each other. A second nut 714 may be disposed on the bus bar 119 so as to firmly fix the first electrode terminal 111 and the second electrode terminal 112 with respect to the bus bar 119. The bus bar 119 may preferably fix the first electrode terminal 111 and the second electrode terminal 112 on substantially the same plane as the circuit substrate 702 substantially.

Accordingly, when the battery units 110 are thermally expanded due to an increase of internal pressure, even though portions of the circuit substrate 702 where the first electrode terminal 111 and the second electrode terminal 112 are inserted can be deformed with respect to the bus bar 119, since there is the gap g between the inner wall of the circuit substrate 702 in which the coupling holes 706 are formed and the boundary of the bus bar 119, a movement space for the portions of the circuit substrate 702 where the first electrode terminal 111 and the second electrode terminal 112 are coupled with respect to the bus bar 119 may be provided.

Figure 8:
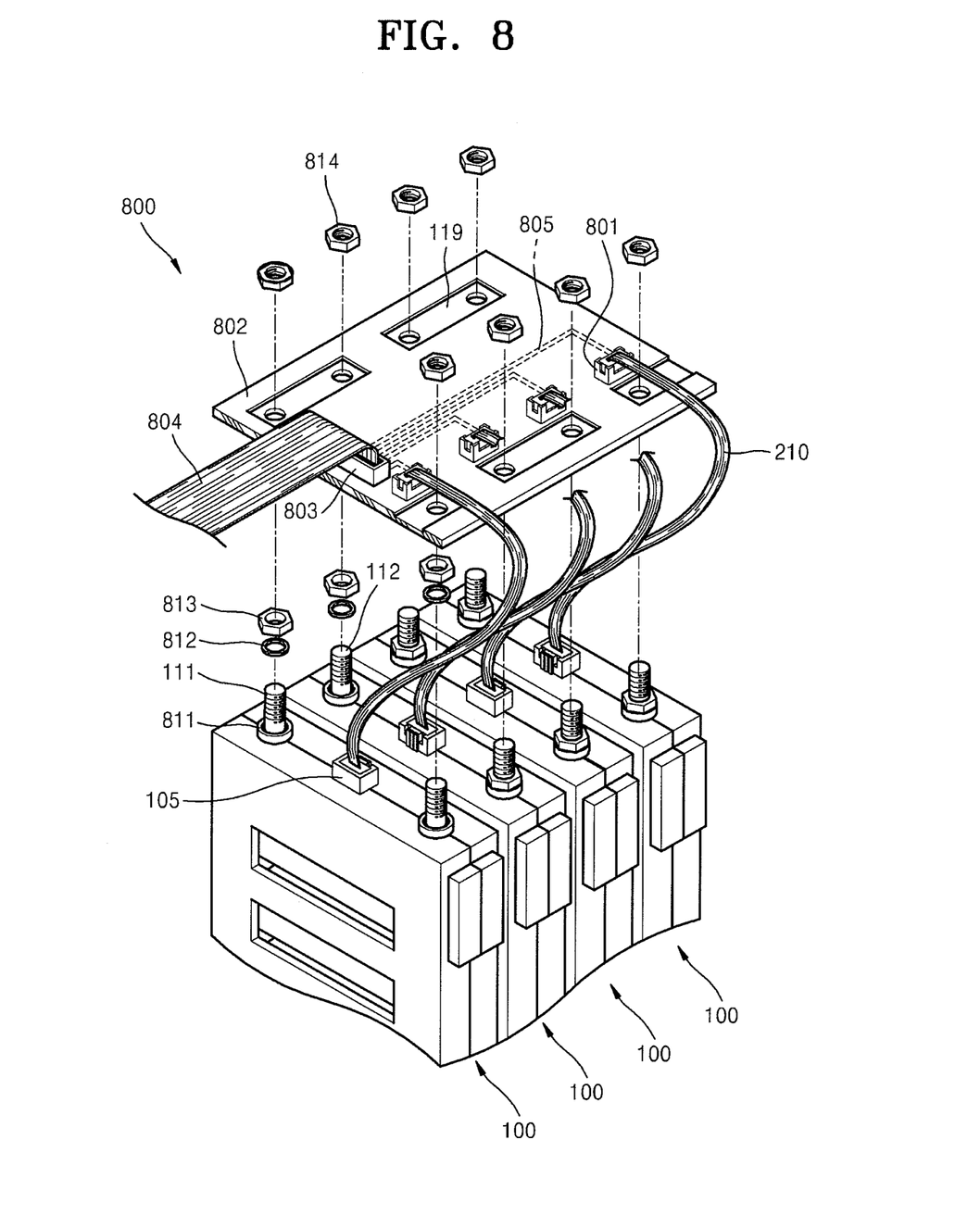
FIG. 8 is a cross-sectional view illustrating a portion of a battery module where a circuit substrate module is mounted, according to another embodiment of the present invention.

FIG. 8 is a cross-sectional view illustrating a portion where a circuit substrate module 800 is mounted, according to another embodiment of the present invention.

Referring to FIG. 8, a circuit substrate 802 may be disposed on a plurality of battery units 100 that are disposed adjacent to one another. A plurality of circuit substrate connectors 801 may be mounted on the circuit substrate 802 in a length direction. The plurality of circuit substrate connectors 801 may be connected to a plurality of communication connectors 105 that are electrically connected to thermistor lines 115 and balancing lines 116 in the battery units 100 via a plurality of connection lines 210.

The circuit substrate connectors 801 may be electrically connected to leads 805, respectively, and the plurality of the leads 805 may be patterned in the circuit substrate 802. The patterned leads 805 may be collected in a single external connector 803, and one cable 804 that is electrically connected to the external connector 803 may be electrically connected to a controller such as a BMS.

A bus bar 119 may be formed in the circuit substrate 801 by insert injection molding. A first electrode terminal 111 and a second electrode terminal 112 may be inserted into the bus bar 119. The first electrode terminal 111 and the second electrode terminal 112 are bolt-shaped in the illustrated embodiment but are not limited thereto.

A gasket 811 is installed between the battery unit 100 and the circuit substrate 802 along a circumference of the first electrode terminal 111 and another gasket 811 may be similarly installed along a circumference of the second electrode terminal 112, and a washer 812 and a first nut 813 may be interposed above each gasket 811. A second nut 814 may be disposed on the bus bar 119 so as to firmly fix the first electrode terminal 111 and the second electrode terminal 112 with respect to the bus bar 119.

As described above, since the bus bar 119 is inserted and injected on the circuit substrate module 800, the battery units 100 and the circuit substrate module 800 may be formed as a module.

Figure 9:
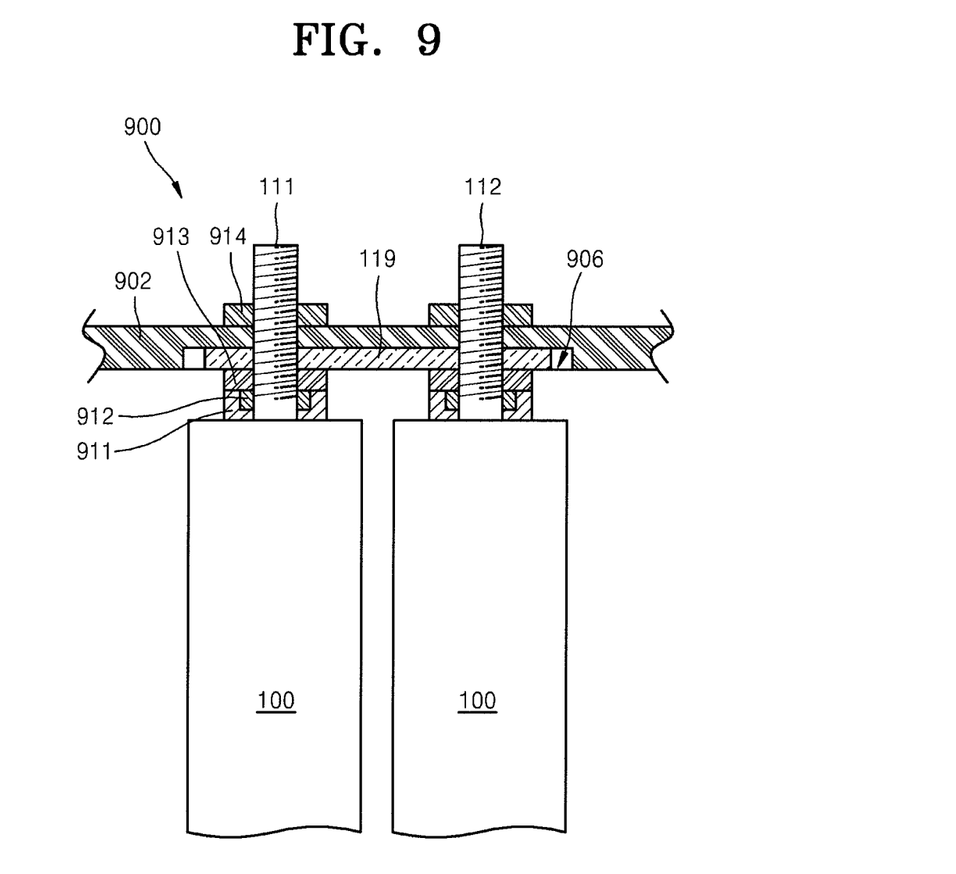
FIG. 9 is a cross-sectional view illustrating a portion of a battery module where a circuit substrate module is mounted, according to another embodiment of the present invention.

FIG. 9 is a cross-sectional view illustrating a portion where a circuit substrate module 900 is mounted, according to another embodiment of the present invention.

Referring to FIG. 9, a circuit substrate 902 may be disposed on a plurality of battery units 100 that are disposed adjacent to each other. A mounting groove 906 may be formed in a surface of the circuit substrate 902 that faces the battery units 100. The mounting groove 906 has a size that is sufficient for each of a plurality of bus bars 119 to be inserted thereinto. The number of mounting grooves 906 can correspond to the number of bus bars 119.

A first electrode terminal 111 and a second electrode terminal 112 may be respectively inserted into the bus bar 119. The first electrode terminal 111 and the second electrode terminal 112 are bolt-type terminals in the illustrated embodiment, but are not limited thereto.

A gasket 911 for insulation, a washer 912, and a first nut 913 may be interposed between the battery unit 100 and the bus bar 119 along a circumference of the first electrode terminal 111 and the same structure may be similarly interposed along a circumference of the second electrode terminal 112. A second nut 914 may be disposed on the circuit substrate 902 so as to firmly fix the first electrode terminal 111 and the second electrode terminal 112 with respect to the bus bar 119.

As described above, as the bus bar 119 that is fixed with respect to the first electrode terminal 111 and the second electrode terminal 112 may be mounted in the mounting groove 906 in the circuit substrate 902, the battery units 100 and the circuit substrate module 900 may be formed as a module.

As described above, according to the one or more of the above embodiments of the present invention, when using the circuit substrate module and the battery modules using the circuit substrate modules, effects as follows may be obtained.

First, a thermistor line and a balancing line drawn from the battery unit may be connected to a communication connector, and two end portions of a connection line may be coupled between a plurality of communication connectors and a plurality of circuit substrate connectors, and thus the assembling operation of the circuit substrate module can be simplified.

Second, since a plurality of leads connected to the plurality of circuit substrate connectors formed in the circuit substrate can be collected and respectively connected to a single external connector, it is easy to work on the circuit substrate module.

Third, a bus bar may be disposed on or under the circuit substrate or in the circuit substrate, and an electrode terminal is coupled to the bus bar, and thus the battery unit and the circuit substrate may be formed as a module.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery module comprising:
 a plurality of battery units, wherein each battery unit comprises a plurality of battery cells, a case for accommodating the plurality of battery cells, a plurality of electrode terminals, and a communication connector coupled to the battery cells and protruding out of the case, wherein the communication connector is configured for transmitting an electrical signal that indicates a temperature or a charging state of the battery cells; and
 a circuit substrate module mounted on the plurality of battery units and comprising a circuit substrate, wherein a plurality of circuit substrate connectors are coupled to the plurality of communication connectors on the circuit substrate,
 wherein the plurality of circuit substrate connectors are coupled to a single external connector that is configured to be coupled to an external device,
 wherein at least one thermistor line having a thermistor sensor installed at the end portion thereof and at least one balancing line having a balancing sensor installed at the end portion thereof are electrically connected to the plurality of battery cells respectively,
 wherein the communication connector is disposed at one side of the case, wherein the communication connector includes a connector housing unit, and a plurality of connection pins which are installed in the connector housing unit and are electrically connected to the at least one thermistor line and to the at least one balancing line wherein a bus bar is formed to electrically connect a pair of adjacent battery units, and a first end of the bus bar is connected to one electrode terminal of a first battery unit having a first polarity, and a second end of the bus bar is connected to one electrode terminal of a second battery unit having a polarity opposite to the first polarity.

2. The battery module of claim 1, wherein the plurality of communication connectors are electrically connected to the plurality of circuit substrate connectors by connection lines.

3. The battery module of claim 1, wherein a plurality of leads are electrically connected to the plurality of circuit substrate connectors, and the plurality of leads is patterned on the circuit substrate and is connected to the single external connector.

4. The battery module of claim 1, wherein the bus bar is coupled to the electrode terminals between the circuit substrate and the battery units by a coupling member.

5. The battery module of claim 1, wherein a plurality of coupling holes is formed in the circuit substrate, and the electrode terminals are inserted into the plurality of coupling holes, and the bus bar is coupled to the electrode terminals on the circuit substrate by a coupling member.

6. The battery module of claim 5, wherein sizes of the coupling holes are greater than sizes of the electrode terminals so that the electrode terminals are configured to move relative to the circuit substrate when the battery units are deformed.

7. The battery module of claim 1, wherein a plurality of coupling holes is formed in the circuit substrate, and the bus bar is inserted into the plurality of coupling holes, and the bus bar is coupled to the electrode terminals within the circuit substrate by a coupling member.

8. The battery module of claim 7, wherein there is a gap in an inner wall of the circuit substrate at which the plurality of coupling holes are formed, and a bus terminal so that the bus bar is configured to move relative to the circuit substrate when the battery units are deformed.

9. The battery module of claim 1, wherein the bus bar is formed in the circuit substrate by insert injection molding and wherein the bus bar is coupled to the electrode terminals by a coupling member.

10. The battery module of claim 2, wherein each connection line has two end portions, and wherein the two end portions are coupled between one of the communication connectors and one of the circuit substrate connectors.

11. The battery module of claim 1, wherein the bus bar is disposed on the circuit substrate, and wherein the battery unit and the circuit substrate are formed as a module.

12. The battery module of claim 1, wherein the bus bar is disposed under the circuit substrate, and wherein the battery unit and the circuit substrate are formed as a module.

13. The battery module of claim 1, wherein the bus bar is disposed in the circuit substrate, and wherein the battery unit and the circuit substrate are formed as a module.

14. The battery module of claim 1, wherein a connection line drawn from each communication connector is configured for electrical connection to a controller.

15. The battery module of claim 14, wherein a controller is a battery management system.

* * * * *